Aug. 14, 1962  R. A. HILDEBRANDT ET AL  3,049,402
SOLVENT EXTRACTION PROCESS FOR SEPARATING ACTINIDE
AND LANTHANIDE METAL VALUES
Filed July 27, 1953

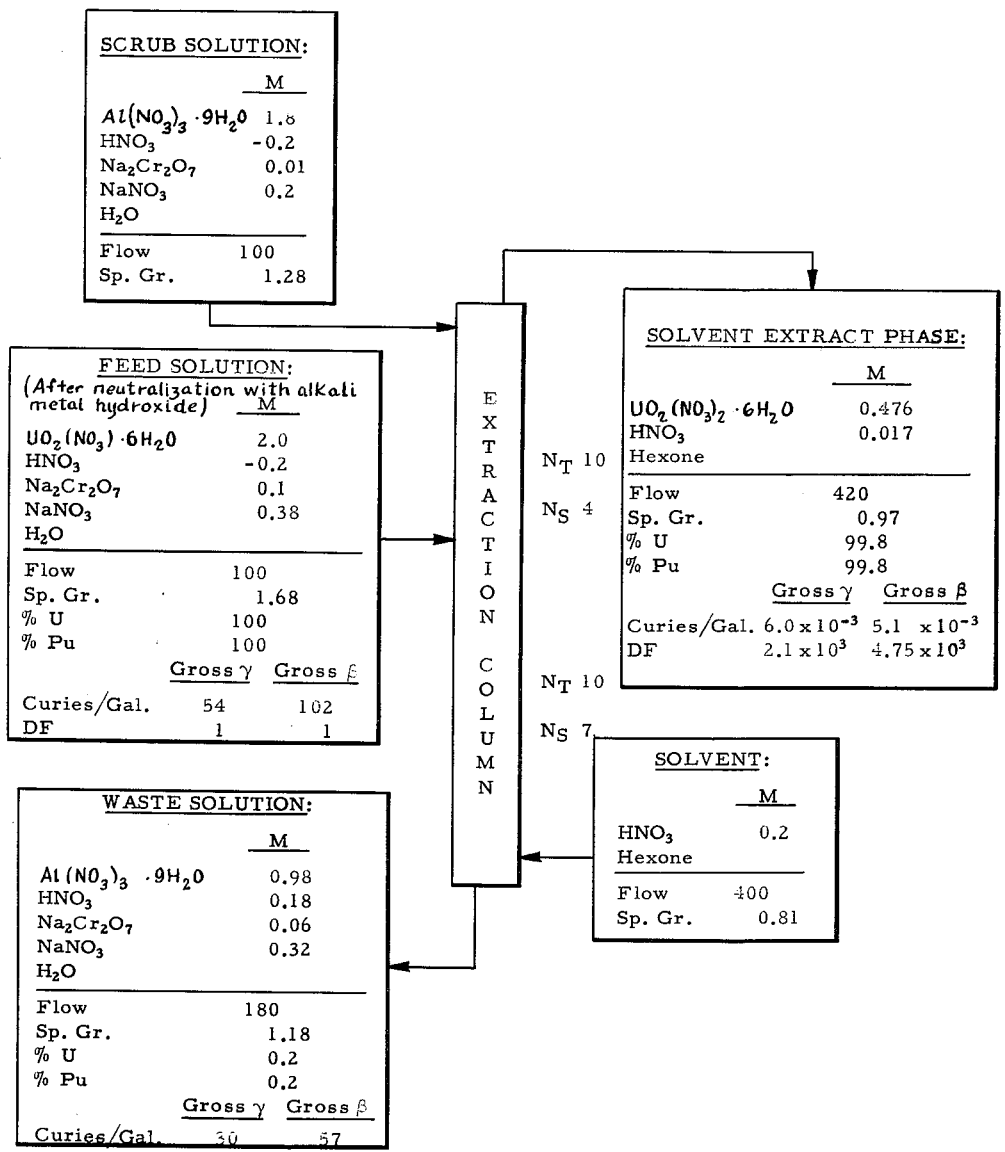

DF = Decontamination factor = quantity of fission products in origined solution:
Flow = flow rate based on flow of feed taken as 100  Quantity of fission products
Sp. Gr. = determined at 25°C                          in solution obtained
% U = based on content of feed taken as 100
% Pu = based on content of feed taken as 100

Gross γ } = based on total fission products present
Gross β }   (countable curies)
$N_S$ = approximate number of theoretical stages required
$N_T$ = approximate number of transfer units required INVENTORS
Robert A. Hildebrandt
Herbert H. Hyman
Seymour Vogler BY: Roland A. Anderson
ATTORNEY 3,049,402
SOLVENT EXTRACTION PROCESS FOR SEPARATING ACTINIDE AND LANTHANIDE METAL VALUES
Robert A. Hildebrandt, Bellwood, and Herbert H. Hyman and Seymour Vogler, Chicago, Ill., assignors to the United States of America as represented by the United States Atomic Energy Commission
Filed July 27, 1953, Ser. No. 376,276
5 Claims. (Cl. 23—14.5)

This invention deals with a process of separating actinide metal values from lanthanide rare earth metal values, hereinafter simply referred to as rare earth metal values, by extraction with a substantially water-immiscible organic solvent.

In extracting actinides, for instance uranium and plutonium from nitric acid solutions of neutron-irradiated uranium slugs, the so-called dissolver solutions, acid conditions have been used heretofore. That means acidified feed and scrub solutions as well as acid-containing solvent have been employed. In these extraction processes, however, the disadvantage was encountered that part of the rare earth metal values, in the case of dissolver solutions the fission products, were extracted together with the uranium and plutonium and that decontamination was thus accomplished to a relatively low degree. A more satisfactory decontamination was obtained when acid-deficient solutions were used in the extraction system, but then the total extraction of the actinides was also impaired and, in the case of dissolver solutions, for instance, the loss of plutonium was considerable. The total extraction of actinides from such acid-deficient systems can, of course, be improved to some degree by the use of a very high concentration of salting-out agent; however, high salt concentrations are also undesirable.

Acid-deficient solutions are not alkaline solutions. They are solutions in which the excess acid and part of the acidity resulting from hydrolysis of the salts present have been neutralized, for instance, with alkali metal hydroxide. A 0.2 M acid-deficient solution, for instance, is a solution to which alkali metal hydroxide has been added in a quantity sufficient to neutralize all of the excess acid and 0.2 M of the acid derived from hydrolysis of the salt. Acid-deficient solutions are still acid solutions; a 0.2 M acid-deficient nitrate-containing solution, for instance, usually has a pH value of about 1.5 for a solution about 2 M in uranyl nitrate.

It is an object of this invention to provide a process for the separation of actinides from rare earth values contained in aqueous solutions in which a relatively low concentration of salting-out agent is required.

It is another object of this invention to provide a process for the separation of actinides from rare earth values contained in aqueous solutions in which a high degree of decontamination of the actinides from the rare earth values is obtained.

It is still another object of this invention to provide a process for the separation of actinides from rare earth values contained in aqueous solutions by which a high degree of extraction of the actinides is achieved.

These and other objects are accomplished by carrying out the extraction in a countercurrent manner so that that part of the extraction using the fresh solvent operates under acid conditions, while the remaining part of the extraction, namely, that in which the solvent has already taken up some of the values to be extracted, and also the scrubbing operation are carried out under acid-deficient conditions. Translating this into column operation using as the solvent, for instance, hexone, which is lighter than aqueous solutions, acid-deficient conditions prevail at the top of the extraction column and acidic conditions in the bottom and lower zones of the column. The acidic hexone at the bottom of the column brings about a high degree of extraction for the actinides; as the hexone flows upwardly in the column, the acid is wished out from it by the acid-deficient feed and scrub solutions, so that in the upper zones of the column the rare earth values which had been taken up by the acidified hexone in the bottom sections are back-extracted from the now acid-poor hexone by the acid-deficient feed and scrub solutions.

The process of this invention thus comprises adding alkali metal hydroxide to a mineral acid solution containing mineral acid salts of actinide metal and rare earth metal to neutralize the excess acid and a part of the acidity derived from hydrolysis of the salts; contacting said solution counter-currently with an acidified substantially water-immiscible organic solvent whereby said actinide salts are preferentially taken up by said solvent while the rare earth salts eventually favor the aqueous solution; and separating an aqueous phase from an organic extract phase.

All mineral acids are usable for the process of this invention; however, nitric acid is the acid most frequently employed, particularly in treating the so-called dissolver solutions for the recovery of uranium and/or plutonium. Of course, the acid content of the solvent should not be so high as to create acid conditions in the top of the column.

For aqueous solutions of hydrolyzable nitrates an acid-deficiency is preferred which corresponds to a pH value of between 0.5 and 3.5, a pH value between 1.5 and 2 being within the most satisfactory range. The degree of acid-deficiency, however, may vary widely.

In the case of plutonium being present, it has to be seen to that it is in the solvent-extractable hexavalent state; this may necessitate the addition of an oxidizing agent. Suitable oxidizing agents for this purpose are bromates, permanganates, dichromates, persulfates, persulfate with a silver catalyst, cerium (IV) compounds, chlorine, bromine, ozone in the presence of silver or cerium ions, periodic acid, alkali metal, bismuthate and cobaltic compounds.

A great number of organic solvents are usable for the process of this invention; for instance, ethers, glycol ethers, esters, ketones, alcohols, alkyl phosphates, nitrohydrocarbons, and alkyl sulfides have given satisfactory results. The preferred solvent for the process of this invention is hexone.

As a salting-out agent, which is preferably used in the form of a separate scrub solution, inorganic salts which are highly soluble in water, very little soluble in the organic solvent and which contain the same anion as the salt to be extracted are suitable. For instance, an ammonium nitrate solution, e.g. of a concentration of about 8 M, and an aluminum nitrate solution containing the salt in a concentration of from 0.5 to 2 M are the most satisfactory scrub solutions for the processing of dissolver solutions.

*Example I*

In the following table, data of a number of experiments are compiled, one of which was carried out under the regular acid conditions (Experiment 1), some were carried out with acid-deficient conditions prevailing throughout the column (Experiments 2, 3, 4 and 7), and two experiments (Experiments 5 and 6) under the improved conditions of the process of this invention, namely, using acid-deficient aqueous feed and scrub solutions and acidic hexone.

| Exp't No. | Type of Process | Operating Conditions ||||||||| Results |||||||
|---|---|---|---|---|---|---|---|---|---|---|---|---|---|---|---|---|
| | | Aqueous Feed (always 0.1 M in Na₂Cr₂O₇) ||| Aqueous Scrub |||| Hexone Extractant || Losses, Percent || Decontamination Factor (log)¹ ||||
| | | Rate ml./min. | U (M) | Acid Deficiency (M) | Rate, ml./min. | Al(NO₃)₃ (M) | Na₂Cr₂O₇ (M) | Acid Deficiency (M) | Rate, ml./min. | HNO₃ (M) | Pu | U | Pu || U ||
| | | | | | | | | | | | | | β | γ | β | γ |
| 1 | Regular Acid | 30.7 | 1.8 | (²) | 30.0 | 1.3 | None | None | 118 | 0.45 | 2.4 | 3.2 | 3.3 | 2.9 | 3.1 | 2.6 |
| 2 | Acid deficient throughout. | 29.2 | 1.98 | 0.18 | 29.1 | 2.0 | None | 0.22 | 117 | None | 1.0 | 2.8 | 4.3 | 4.1 | 3.9 | 3.4 |
| 3 | ....do........ | 25.8 | 2.07 | 0.22 | 33.8 | 2.0 | None | 0.25 | 120 | None | 1.2 | 0.5 | 4.1 | 3.9 | 3.9 | 3.6 |
| 4 | ....do........ | 29.1 | 1.93 | 0.22 | 31.2 | 2.0 | None | 0.18 | 117 | None | 1.2 | 3.9 | 4.4 | 3.9 | 3.9 | 3.5 |
| 5 | Acid deficient at top of column only. | 29.1 | 1.93 | 0.22 | 31.2 | 2.0 | None | 0.18 | 117 | 0.10 | 0.8 | 1.4 | 4.4 | 4.0 | 4.1 | 3.8 |
| 6 | ....do........ | 30.9 | 2.07 | 0.20 | 31.1 | 2.0 | 0.01 | 0.19 | 118 | 0.20 | 0.4 | 0.6 | 4.1 | 3.8 | 4.1 | 3.7 |
| 7 | Acid deficient throughout. | 29.1 | 2.0 | 0.20 | 31.3 | 2.0 | 0.01 | 0.22 | 117 | None | 0.7 | 2.0 | 4.2 | 3.8 | 3.9 | 3.6 |

¹ Decontamination Factor: $\frac{\text{quantity of fission products in the original solution}}{\text{quantity of fission products in the solution obtained}}$ ² This feed solution was not acid-deficient but contained free nitric acid in a concentration of 0.37 M.

The table shows that optimal results as to both plutonium and uranium losses and decontamination are obtained by the combination of acidic conditions with acid-deficient conditions. The relatively high plutonium and uranium losses in the acid process (Experiment 1) are due to the lower concentration of salting-out agent.

*Example II*

In the accompanying drawing a flow sheet of the process of this invention is shown as it has been used on a large scale for the extraction of dissolver solutions. In this flow sheet the data of one typical extraction experiment are given.

In this experiment the dissolver solution had ben obtained by dissolving uranium which had been irradiated with neutrons of thermal energy for 360 days to give an exposure of 400 megawatt-days per ton followed by a period of 90 days of storage under cooling conditions. The fission product contents of the solution were then determined for beta- and gamma-emitters in so-called countable curies.

A theoretical or absolute curie is defined as the radioactivity of a source of radiation which decays at such a rate that $3.7 \times 10^{10}$ atoms change per second. It is almost exactly the radioactivity of the amount of radon in equilibrium with 1 gram of radium. Because of the limitations of ordinary radiation counters, absolute curies are difficult to determine.

The "countable" curie values, which have the practical advantages of easy determination and of being reproducible, are ascertained under specified conditions with standard counting instruments.

The dissolver solution obtained as described above contained 330 absolute and 100 countable curies per gallon for beta-activity and 230 absolute and 55 countable curies per gallon for the gamma-activity.

Some of the fission products responsible for the 330 and 230 absolute curies for beta- and gamma-activity, respectively, were found to be cerium[141] (10.1 curies per gallon each for beta and gamma), cerium[144]-praseodymium[144] (44.3 curies per gallon each for beta and gamma), yeterbium[91] (39.5 beta curies per gallon), and prometheum[147] (9.1 beta curies per gallon). These values show that a great part of the radioactivity in dissolver solutions is due to the presence of rare earths values.

The experiment of the flow sheet demonstrates that in one single extraction step a satisfactory decontamination can be obtained (decontamination factor of $2.1 \times 10^3$ for gamma-emitters and $4.75 \times 10^3$ for beta-emitters); the losses of plutonium and uranium amounted to 0.2% only each. Repetition of this procedure, of course, would bring about a further decontamination.

*Example III*

In this example the same set-up and the same number of steps for the various solutions were used as in Example II.

The feed contained uranyl nitrate in a concentration of 2 M, sodium nitrate in a concentration of 0.27 M and was 0.2 M nitric acid-deficient. It had $5.1 \times 10^{-6}$ gross gamma-curies per gallon and $5.6 \times 10^{-5}$ gross beta-curies per gallon. The feed had a specific gravity of 1.67 and a relative flow rate of 100. The solution had been obtained by treating a dissolver solution by the process of this invention for the removal of plutonium. Only $1 \times 10^{-7}$ of the initial plutonium content was still left in the feed. A uranium loss of 0.5% had occurred in this plutonium removal procedure.

The solvent had the same composition, specific gravity, and relative flow rate as that used in Example II.

The scrub solution also had the same flow rate and specific gravity as in Example II; its composition in this instance was 1.8 M in aluminum nitrate, 0.05 M in ferrous sulfamate, 0.20 M in sodium nitrate and 0.2 M acid-deficient.

The hexone extract phase obtained in this instance was 0.475 M in uranyl nitrate, 0.017 M in nitric acid and contained 99.8% of the feed for this extraction step, which feed contained 99.5% of the 100% of uranium present in the dissolver solution; the remaining 0.2% of the uranium was found in the aqueous waste solution.

This hexone extract phase was then "stripped" in a separate column with water (flow rate of water 200, flow rate of the hexone extract phase 420) whereby the uranium was taken up by the water. The aqueous solution of uranyl nitrate obtained thereby contained 99.75% of the feed uranium and 99.25% of all the uranium originally present in the dissolver solution and about, or less than, $9.7 \times 10^{-6}$ gross gamma-curies per gallon and about, or less than, $2.8 \times 10^{-5}$ gross beta-curies per gallon.

This example shows that the process of this invention is also satisfactorily applicable to the separation of uranium and rare earth values from solutions in which traces only of, or no, plutonium is present.

The process of this invention is applicable to the separation or decontamination of all actinides from rare earth values. It is not solely useful in the separation of uranium and plutonium from neutron-irradiated fuel elements, but it may also be employed, for instance, in the recovery of uranium and its separation from rare earths from solutions obtained in the processing of uranium ores, as has been discussed in connection with Example II.

It will be understood that this invention is not to be limited to the details given herein but that it may be modified within the scope of the appended claims.

What is claimed is:

1. A process for separating actinide metal values from lanthanide rare earth metal values all contained as salts in an aqueous mineral acid solution, which comprises neutralizing the excess acid and a part of the acid from hydrolysis of said salts in said solution, countercurrently contacting the solution with an acidified organic solvent immiscible therewith, said acidified organic solvent containing an introduced mineral acid in amount insufficient to fully replace the acid of hydrolysis of the salts in the aqueous phase; and during said countercurrent contact, transferring acid from the organic solvent to the aqueous phase to thereby increase the tendency of the latter to retain the lanthanide rare earth metal values and preferentially transferring said actinide metal values to said organic solvent.

2. A process for separating uranyl nitrate from lanthanide rare earth metal nitrates all contained in an aqueous nitric acid solution, which comprises neutralizing the excess acid and a part of the acid from hydrolysis of said nitrates in said solution, countercurrently contacting the solution with nitric acid-containing hexone, said nitric acid contained in the hexone being insufficient to fully replace the acid of hydrolysis of the nitrates in the aqueous phase; and during said countercurrent contact, transferring nitric acid from the hexone to the aqueous phase to thereby increase the tendency of the latter to retain the lanthanide rare earth metal nitrates and preferentially transferring said uranyl nitrate to said hexone.

3. The process of claim 2 wherein the aqueous nitric acid solution also contains aluminum nitrate as a salting-out agent.

4. The process of claim 2 wherein alkali metal hydroxide is added to the solution for neutralization until a pH value of between 0.5 and 3.5 is obtained.

5. The process of claim 2 wherein alkali metal hydroxide is added to the solution until a pH value of between 1.5 and 2 is obtained.

References Cited in the file of this patent

UNITED STATES PATENTS 2,227,833    Hixson et al. _____ Jan. 7, 1941

OTHER REFERENCES

Katzin et al.: U.S. Atomic Energy Commission Declassified Document AECD–2758, November 20, 1947, 12 pages. Copy in Scientific Library.